March 15, 1966  SEIICHIRO FUJIMORI  3,240,136
CAMERA CONTROL MEANS
Filed Sept. 7, 1961  3 Sheets-Sheet 1
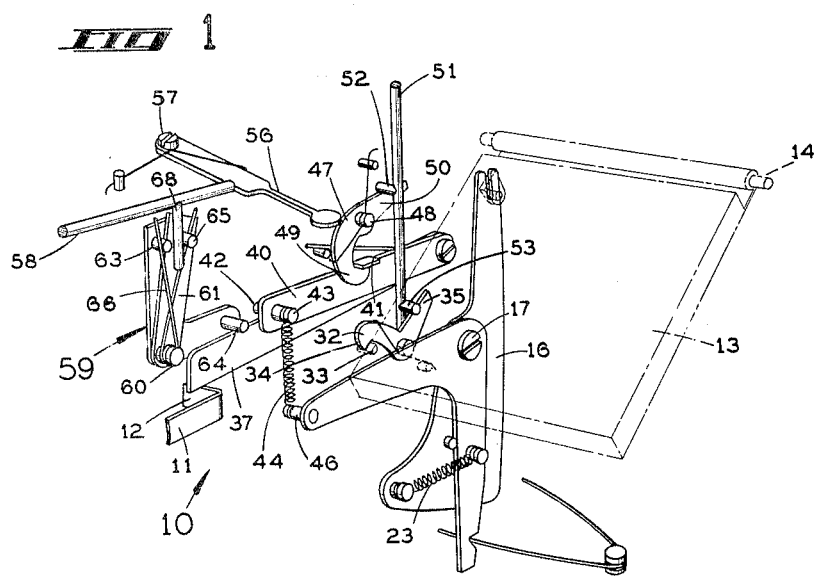
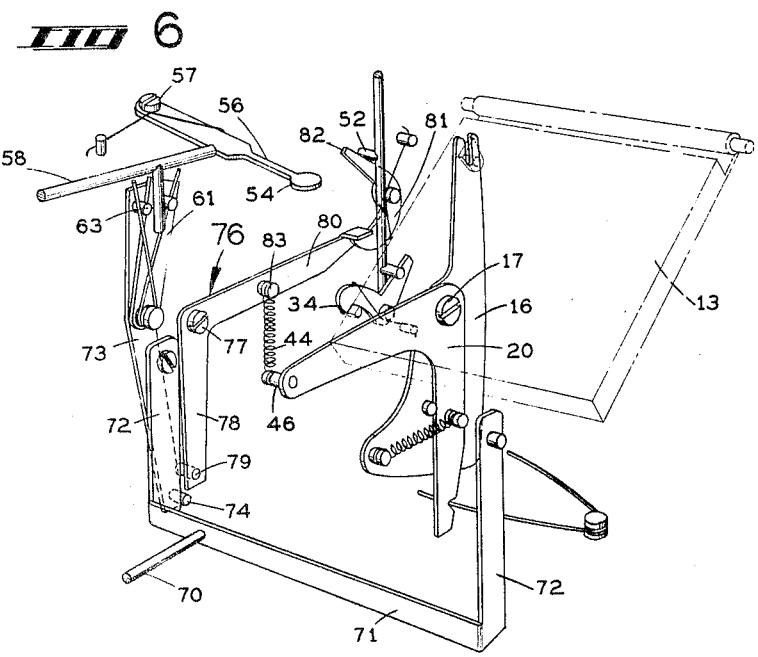
INVENTOR.
SEIICHIRO FUJIMORI
BY
Stanley Wolder
ATTORNEY March 15, 1966  SEIICHIRO FUJIMORI  3,240,136
CAMERA CONTROL MEANS Filed Sept. 7, 1961  3 Sheets-Sheet 2

INVENTOR.
SEIICHIRO FUJIMORI
BY
Stanley Welder
ATTORNEY

March 15, 1966  SEIICHIRO FUJIMORI  3,240,136
CAMERA CONTROL MEANS

Filed Sept. 7, 1961  3 Sheets-Sheet 3

INVENTOR.
SEIICHIRO FUJIMORI
BY
Stanley Wolder
ATTORNEY

United States Patent Office 3,240,136
Patented Mar. 15, 1966

3,240,136
CAMERA CONTROL MEANS
Seiichiro Fujimori, Itabashi-ku, Tokyo, Japan, assignor to Asahi Optical Industry Co., Ltd. (Japanese name: Asahi Kogaku Kogyo Kabushiki Kaisha), Tokyo, Japan, a corporation of Japan
Filed Sept. 7, 1961, Ser. No. 136,576
Claims priority, application Japan, Dec. 21, 1960, 35/50,523
14 Claims. (Cl. 95—10)

The present invention relates generally to improvements in cameras provided with a light measuring means and it relates more particularly to an improved camera of the single lens reflex type having an automatic preset diaphragm and provided with a built-in exposure meter.

The conventional single lens reflex camera is provided with a main lens and a mirror which is swingable in and out of registry with the optical axis of the camera main lens and forms part of the camera through the lens viewing system. Upon release of the shutter the mirror is retracted from the path of light through the main lens to permit the image to be cast on the photographic film attendant to the exposure thereof. It has been previously proposed to locate a photosensitive element in the proximity of the focal plane of the mirror reflected image to determine the intensity of the light which will be directed to the film. The photosensitive element is connected to a sensitive current meter which may directly indicate the required shutter speed since the light incident thereon is not only a function of the subject light conditions but also of the lens diaphragm opening. However, the systems heretofore employed or suggested possess numerous drawbacks and disalvantages. To begin with the systems cannot be used with a single lens reflex camera provided with an automatic preset diaphragm since the mirror reflected image is always obtained with the lens wide open so that a direct reading of the required shutter speed is not automatically provided. The use of this system thus requires the adjustment of the diaphragm opening and shutter speed following the light meter reading, a procedure which is desirably avoided. Further disadvantages of the conventional arrangement are a consequence of the light sensitive element being permanently located at the focal plane of the mirror reflected image. The continuous and long exposure of the photosensitive element to the light results in the fatigue and depletion of the light sensitive element as well as any power source that may be associated therewith. Furthermore, the location of the light sensitive element in the reflected image focal plane may not only interfere with the mirror flipping mechanism but would also interfere with the viewing procedure.

It is therefore a principal object of the present invention to provide an improved photographic camera provided with built-in light measuring means.

Another object of the present invention is to provide an improved photographic camera of the single lens reflex type provided with a built-in exposure meter.

Still another object of the present invention is to provide an improved single lens reflex camera having an automatic preset diaphragm and a light measuring means which responds to the lens preset opening.

A further object of the present invention is to provide a single lens reflex camera having light measuring means which are selectively actuated.

Still a further object of the present invention is to provide an improved single lens reflex camera of the above nature characterized by its simplicity, versatility, ruggedness and ease and dependability of operation.

The above and other objects of the present invention will become apparent from a reading of the following description taken in conjunction with the accompanying drawings, wherein:

FIGURE 1 is a perspective view of a mechanism embodying the present invention, the swinging mirror being illustrated in broken line, the camera being in a dormant uncocked position and the photoresponsive element being retracted.

FIGURE 6 is a perspective view of another embodiment of the present invention.

Figure 2:
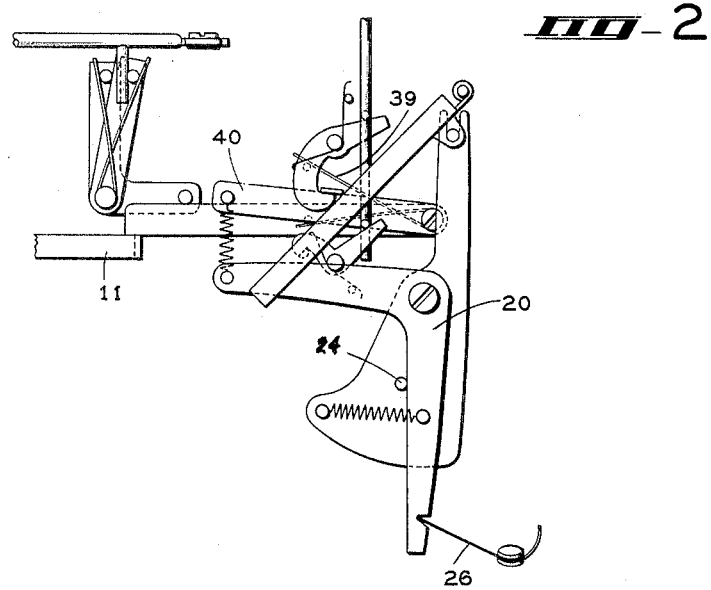
FIGURE 2 is a side elevational view thereof.

In a sense the present invention contemplates the provision in a single lens reflex camera including a lens and an automatic preset diaphragm provided with a diaphragm set member movable between an advance diaphragm set position and a retracted diaphragm open position, a first actuating means adapted to move said set member between its retracted and advance position, a photoresponsive element, means adapted to move said photoresponsive element between an advance position in the path of the light passing through said lens and a retracted position and means operable with said light sensitive element adapted to move said set member between its retracted and advance position.

According to a preferred form of the present invention the camera is provided with a mirror swingable between an advanced, image reflecting position and a retracted position and the photosensitive element is mounted at the end of a pivoted arm and swingable therewith into and out of registry with the mirror reflected framed image at the focal plane thereof corresponding to advanced and retracted positions respectively. A spring influenced lever is adapted to urge the mirror towards its retracted position, the mirror being releasably locked in its advanced position following the completion of the shutter operation. A vertically swingable arm is releasably locked in a raised retracted position and is spring urged to a depressed advance position and adapted to bear against and depress a concentrically swingable second arm which is normally spring urged upwardly to a retracted position, the second arm engaging the diaphragm set member. A first actuating member engages the photosensitive element carrying arm to permit the advancing thereof and is coupled by resilient means into separable engagement with the aforesaid second arm to permit the depression thereof independent of the movement of said first arm and the setting of the lens diaphragm concurrent with the advance of the photosensitive element. A second actuating member is provided which permits the release of the mirror to its retracted position and the second arm to its advanced position. The camera shutter cocking and release mechanism is conventional and includes means for automatically advancing the mirror following the full operation of the shutter, loading a mirror retraction spring attendant to the cocking of the shutter and the releasing of the cocked shutter upon retraction of the mirror.

Referring now to the drawings and particularly FIGURES 1 to 5 thereof which illustrate a preferred embodiment of the present invention, the reference numeral 10 generally designates the present improved mechanism as employed in a single lens reflex camera. The camera includes a main lens (not shown) of conventional construction provided with an automatic preset diaphragm actuated by a longitudinally rearwardly projecting diaphragm setting arm 11 terminating in a transverse lug 12. The lens diaphragm is normally urged to its fully open position and to arm 11 to its raised position, depression of the arm 11 effecting the setting of the lens diaphragm to its predetermined position in the usual manner. Also associated with the camera is a mirror 13 swingable about an upper rear transverse axis 14 between an advanced position intersecting the optical axis of the camera lens at an oblique angle of preferably 45° to project an image on a horizontal focal plane which permits through the lens viewing, and a retracted position out of the path of light through the camera lens to permit the projection of the image on the plane of the film.

The mirror actuating mechanism includes a vertical lever plate 16 supported between its upper and lower ends by a stationary pin 17 and rotatable about a transverse axis. The lever plate 16 terminates at its top in a forked end 18 which slidably engages a laterally extending pin 19 carried by a bracket depending from the rear side edge of the mirror member 13. Also supported by the pin 17 is a bell crank 20 rotatable about its knee and including a forwardly directed arm 21 and a depending arm 22. A tension spring 23 is connected between pins carried by the crank arm 22 between its ends and by the lever plate 16 at the bottom forward corner thereof. A detent pin 24 is also mounted on the lower forward section of the lever plate 16 in the path of the crank arm 22 to permit the engagement between the crank 20 and lever plate 16. A hairpin spring 26 is supported at its knee by the stationary vertical pin 27 and has one leg engaging a notch formed in the lower trailing edge of the crank arm 22 and the other leg engaged by a stationary detent to resiliently urge the bell crank in a clockwise direction as viewed in the drawings.

Figure 3:
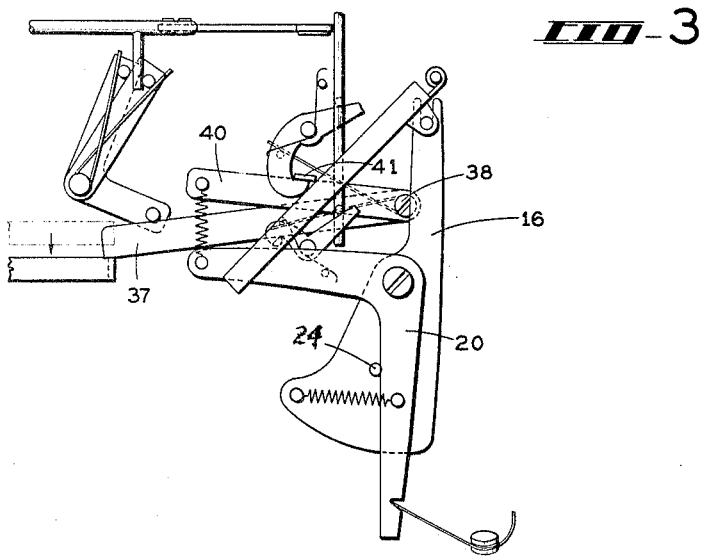
FIGURE 3 is a view similar to FIGURE 2, the photoresponsive element, however, being in its advanced position.
Figure 4:
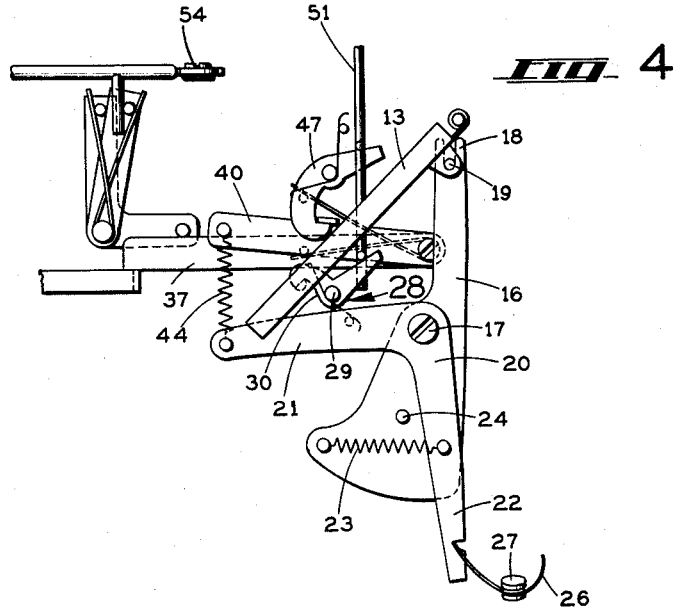
FIGURE 4 is a view similar to FIGURE 2, the shutter being in cocked position.
Figure 5:
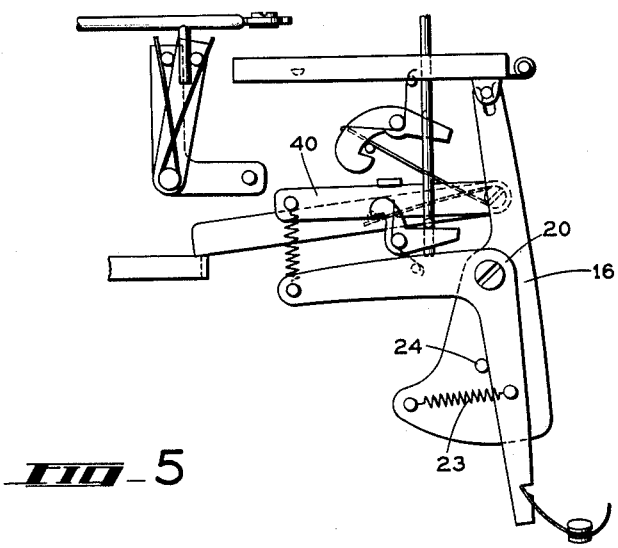
FIGURE 5 is a view similar to FIGURE 2, the mirror having been retracted attendant to the actuation of the shutter.

An angular pawl member 28 is swingably mounted on a stationary pin 29 and includes a first arm 30 terminating in a hooked end 32 realeasably engaging a detent pin 33 projecting laterally from the lower side edge of the mirror 13 to hold the mirror 13 in its advanced position. The outer edge 34 of the hooked end 32 defines a cam surface. The pawl member 28 includes a rearwardly directed trip arm 35 and is urged counterclockwise to a latch position by a cooperating hairpin spring. The camera associated with the mechanism 10 includes, in the well known manner, means for rocking and locking the bell crank 20 in its counterclockwise position with the advancing of the film or the cocking of the shutter, as seen in FIGURES 4 and 5, and releasing the bell crank 20 to return to its clockwise position under the influence of the spring 26, upon the completion of the shutter operation, as seen in FIGURES 2 and 3. When the bell crank 20 is in its counterclockwise position the spring 23 is stressed to urge lever 16 counterclockwise to swing the mirror 13 to its retracted position when released by the pawl 28. Upon release of the bell crank 20 as aforesaid, under influence of the spring 26, the crank arm 20 bears against the detent pin 24 on the lever to swing the lever 16 clockwise and the mirror 13 to its advanced position. It should be noted that means are provided in the well known manner whereby the shutter is released upon the mirror 13 approaching its fully retracted position.

In order to effect the automatic setting of the diaphragm immediately prior to the release of the shutter there is provided a first longitudinally extending arm 37 pivotly supported at its trailing end by a stationary pin 38 and bearing at its leading end upon the diaphragm set member lug 12. A hairpin spring 39 is supported by the pin 38 and has divergent arms bearing on a stationary pin and a pin detent mounted on the arm 37 to resiliently retain the arm 37 in a raised position. A second longitudinally extending arm 40 is rockably supported at its trailing end by the pin 38 and is provided intermediate its ends with a transversely projecting ear 41. Mounted at the leading end of the arm 40 are oppositely directed transverse pins 42 and 43, respectively, the pin 42 being disposed above the arm 37 and movable into engagement therewith and the pin 43 is connected by a helical tension spring 44 to a pin 46 mounted at the free end of the crank arm 21. Thus the arm 40 is spring urged downwardly when the bell crank 20 is in its counterclockwise position.

A pawl member 47 is rockably supported by a pin 48 above the ear 41 and includes a pawl defining hooked arm 49 releasably engaging the ear 41, and an oppositely directed trip arm 50. A hairpin spring supported by the pin 48 and bearing against the arm 49 and a stationary abutment urges the pawl member 47 counterclockwise to a latch position. A depressible shutter release or plunger rod 51 projects through the camera so as to permit finger motivation and includes a first laterally projecting leg 52 resting on the pawl trip arm 50 and a second leg 53 resting on the pawl trip arm 35. Depression of the plunger 51 concurrently trips the pawl members 28 and 47 to release the mirror 13 and arm 40.

The light measuring system includes a photosensitive element 54 mounted at the free end of a horizontally swingable arm 56 the opposite end of which is pivoted to a stationary pin 57. A hairpin spring supported by the pin 57 engages a stationary detent and the arm 56 to resiliently urge the arm 56 to a retracted position. The photosensitive element 54 may be of the photoconductive type, such as a cadmium sulphide cell, and is connected through an electric current source or by way of a solid state amplifier to a sensitive current meter which furnishes an indication of the light incident upon the photosensitive element 54. The meter scale and indicator may be observable, in the well known manner, through the camera viewing system. When the arm 56 is in its advanced position the photosensitive element 54 is supported at the focal plane and within the frame of the image reflected by the advanced mirror 13 and when the arm is retracted, the element 54 is outside the frame of the reflected image.

A horizontally slidable finger manipulated rod 58 projects through the camera and has its trailing end bearing on the arm 56 to permit the swinging thereof from its retracted to its advanced position. Disposed below the rod 58 are a bell crank 59 rockably supported at its knee by a pivot pin 60 and an upwardly directed arm 61 swingably supported at its lower end by the pin 60. The bell crank 59 includes a vertical arm carrying a transversely projecting detent 63, and a horizontal arm carrying a transversely projecting detent 64 which rests on the free end of the arm 37. The swingable vertical arm 61 carries at its free end a transversely projecting detent 65, the detents 63 and 65, and the arm 61 and the vertical crank arm being resiliently urged toward each other by a hairpin spring 66 registering with the pin 60 and having arms bearing on the detents 63 and 65. The rod 58 is provided with a depending leg 68 entrapped between the detents 63 and 65.

Considering now the operation of the mechanism described above, the automatic diaphragm control ring is preset to the desired value and the camera is directed at the subject to be photographed. The rod 58 is then pressed inwardly, the depending leg 68 carrying the detent 65 and the arm 61 rearwardly therewith and urging the clockwise rotation of the bell crank 59 which rotation is effected by way of the hairpin spring 66. Concurrently, the crank arm carried detent 64 swings the arm 37 downwardly against the influence of the spring 39 to depress the diaphragm set member 11 and close the diaphragm to its previously preset position. Further inward movement of the rod 58 and leg 68 to swing the arm 61 beyond the fully depressed position of the arm 37 and the fully advanced position of the bell crank 59 is taken up by the spring 66 which is additionally loaded. As the rod is pressed fully inwardly it urges the arm 56 to its rearward position to support the photosensitive element 54 in its advanced position in registry with the mirror reflected image at its focal plane. The light reading may now be made and since it is a function of the lens diaphragm preset opening such reading may directly indicate the desired shutter speed. It should be noted that during the aforesaid procedure the mirror 13 is locked in its advanced position by the pawl 28 and the arm 40 is locked in its raised position by the pawl 47. Following the light reading the rod 58 is released to return the various members to their initial retracted positions as illustrated in FIGURE 2.

The film is then advanced and the shutter cocked to concurrently rock the bell crank 20 clockwise and load springs 26, 33 and 44, as aforesaid, to the positions illustrated in FIGURE 4, and the shutter speed is then adjusted. Upon the depression of the shutter release rod 51 the leg 52 bears on the trip arm 50 to rotate the pawl member 47 out of engagement with the ear 41 releasing the arm 40 which is depressed by the spring 44. The detent pin 42 in turn depresses the arm 37 to urge the diaphragm set member 11 to its advanced diaphragm close preset position. It should be noted that this operation does not effect the movement of the photosensitive element 54. Concurrent with the tripping of the pawl 47 the leg 53 depresses the pawl trip arm 35 rocking the pawl member 28 clockwise to disengage the pin 33 and release the mirror 13. The lever 16 is rocked counterclockwise by the spring 23 and by way of the pin 19 swings the mirror to its upper retracted position as illustrated in FIGURE 5. As the mirror travels toward its retracted position it releases the shutter in the usual manner to effect the exposure of the film. Following the exposure of the film the rod 51 is released permitting the pawls 28 and 47 to be spring returned to their latch positions.

The camera shutter as it approaches the end of its stroke, in the well known manner, releases the bell crank 20 which is rocked clockwise by the loaded spring 26, the crank arm 22 bearing against the detent 24 carried by the lever 16 to rock the lever 16 clockwise and setting the mirror 13 to its advanced position. As the mirror 13 approaches its advanced position the mirror carried detent 33 passes along and is engaged by the pawl 28 to releasably lock the mirror 13 in its advanced position. In addition, the arm 40 relieved of the tension of the spring 44 is raised by the spring 39 and is releasably locked in its raised position by the pawl 47 engaging the ear 41. As a consequence the arm 37 is released and spring returned to its raised position permitting the retraction of the set member 11 and the full opening of the diaphragm. The camera is now in condition for a repetition of the above cycle of operation.

The embodiment of the present invention illustrated in FIGURE 6 of the drawings is similar to that described above except as applied to an automatic preset diaphragm wherein the setting operation is effected by a longitudinally movable member. Except as hereinafter set forth, the mechanism is as in the first embodiment and the same reference numerals designate corresponding parts. More particularly, the diaphragm set member is defined by a longitudinally movable rod 70 projecting forwardly from a lateral cross piece 71 supported by and between the lower ends of a pair of laterally spaced parallel arms 72 pivotly supported at their upper ends. In place of the earlier bell crank 59 there is provided a vertical slightly angulated lever 73 pivotly supported between its ends by the pin 60 and provided at its lower rear edge with a detent 74 bearing against the lower rear edge of the arm 72. The pin 63 is mounted at the upper end of the lever 73. It should be noted that the arm 72 is the counterpart of the arm 37.

A bell crank 76, the counterpart of the arm 37 is rockable about a support pin 77 and includes a front depending arm 78 provided with a lateral detent 79 bearing on the arm 72, and a rearwardly directed arm 80. The arm 80 terminates in a lateral ear which is releasably engaged by a rockable pawl 81 spring urged to a latch position, and including a trip arm 82 engaged by the plunger leg 52. The tension spring 44 connects the crank arm carried pin 46 to a pin 83 mounted on the arm 80. In all other respects the last described embodiment is similar to that earlier described.

The operation of the mechanism illustrated in FIGURE 6, except for the longitudinal movement of the set member 70, is like that previously described and requires no further explanation.

While there have been described and illustrated preferred embodiments of the present invention, it is apparent that numerous alterations, omissions and additions may be made without departing from the spirit thereof.

What is claimed is:

1. In a single lens reflex camera including a lens and an automatic preset diaphragm provided with a diaphragm set member movable between an advance diaphragm set position and a retracted diaphragm open position, a first actuating means adapted to move said set member between its retracted and advance positions, a light sensitive element, means adapted to move said light sensitive element between an advance position in the path of the light passing through said lens and a retracted position, and means operable with the movement of said light sensitive element adapted to move said control member between its retracted and advance position.

2. In a single lens reflex camera including a lens and an automatic preset diaphragm provided with a diaphragm set member movable between an advanced diaphragm set position and a retracted diaphragm open position, a shutter release member, first means responsive to said shutter release member adapted to move said diaphragm set member between said retracted and said advanced position, a light sensitive element, second means adapted to move said light sensitive element between an advanced position in the path of the light passing through said lens and a retracted position, and third means independent of said first means and responsive to said second means adapted to move said diaphragm set member between its retracted and advanced position.

3. A camera according to claim 2 wherein said second means includes a pivoted arm carrying said light sensitive element adjacent its free end, spring means normally urging said arm to a retracted position and a manipulative member engaging said pivoted arm.

4. A camera according to claim 2 wherein said light sensitive element is movable into and out of registry with the frame of the image focal plane of said lens.

5. A camera according to claim 2 wherein said diaphragm set member is movable in a direction transverse to the optical axis of said lens and including a swingable arm having a free end bearing upon said diaphragm set member and movable between a retracted position and an advanced position urging set diaphragm set member toward its advanced position, said swingable arm being selectively independently actuatable by said first and second means.

6. A camera according to claim 2 wherein said diaphragm set member is movable in a direction parallel to the optical axis of said lens and including an arm swingable about an axis transverse to the optical axis of said lens and engaging said diaphragm set member and movable between a retracted position and an advanced position urging set diaphragm set member toward its advanced position, said swingable arm being selectively independently actuatable by said first and second means.

7. A camera according to claim 2 including a swingable arm having a free end bearing upon said diaphragm set member and movable between a retracted position and an advanced position urging set diaphragm set member toward its advanced position, said swingable arm being selectively independently actuatable by said first and second means.

8. A camera according to claim 7 including spring means normally urging said swingable arm toward its retracted position.

9. In a single lens reflex camera including a lens and an automatic preset diaphragm provided with a diaphragm set member movable between an advanced diaphragm set position and a retracted diaphragm open position and a mirror swingable between an advanced position intersecting the optical axis of said lens to focus an image on a framed viewing focal plane and a retracted position and being spring urged toward a retracted position, a shutter release member, means releasable in response to said shutter release member locking said mirror in its advanced position, first means responsive to said shutter release member adapted to move said diaphragm set member between said retracted and said advanced position, a light sensitive element, second means adapted to move said light sensitive element between an advanced position substantially in registry with said framed viewing focal plane and a retracted position out of registry therewith, and third means independent of said first means and responsive to said second means and adapted to move said diaphragm set member between its retracted and advanced position.

10. A camera according to claim 9 wherein said first means includes a swingable arm movable between a retracted position and an advanced position urging said diaphragm set member toward its advanced position and spring urged to its advanced position, and means locking said swingable arm in its retracted position and releasable in response to said shutter release member.

11. A camera according to claim 9 including a pivoted arm carrying at an end thereof said light sensitive element and swingable with said light sensitive element between advanced and retracted positions in and out of registry with said image focal plane and spring means normally urging said arm toward its retracted position.

12. A camera according to claim 11 including finger actuated means adapted to engage said light sensitive element carrying arm.

13. A camera according to claim 9 wherein said third means includes resilient means coupling said light sensitive element to said diaphragm set member.

14. In a single lens reflex camera having an exposure meter including a measuring instrument and a photosensitive cell, with the cell being mounted for movement into and out of the path of light rays entering through the camera objective; a diaphragm; a diaphragm adjuster; setting means operatively connected to said adjuster and operable to adjust said diaphragm; and manually actuable means connected both to said cell and to said setting means and effective, when actuated, to operate said setting means to adjust said diaphragm to a position determined by said adjuster and to move said cell into such light ray path.

References Cited by the Examiner
UNITED STATES PATENTS

| | | | |
|---|---|---|---|
| 2,754,735 | 7/1956 | Meyer | 95—10 |
| 2,784,654 | 3/1957 | Meyer | 95—10 |
| 2,937,582 | 5/1960 | Goshima | 95—10 |

NORTON ANSHER, *Primary Examiner.*

D. B. LOWE, *Examiner.*